(12) United States Patent
Hughes et al.

(10) Patent No.: US 8,370,839 B2
(45) Date of Patent: Feb. 5, 2013

(54) MONITORING MESSAGE QUEUES IN MESSAGE QUEUING INFORMATION SYSTEMS AND INITIATING BATCH JOBS TO PERFORM FUNCTIONS ON THE MESSAGE QUEUES

(75) Inventors: Gerald D. Hughes, Morgan Hill, CA (US); Steve T. Kuo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1322 days.

(21) Appl. No.: 11/758,630

(22) Filed: Jul. 20, 2007

(65) Prior Publication Data

US 2009/0024998 A1    Jan. 22, 2009

(51) Int. Cl.
*G06F 9/46* (2006.01)
*G06F 15/16* (2006.01)

(52) U.S. Cl. ......... 718/101; 718/102; 709/203; 709/206

(58) Field of Classification Search .................. None
See application file for complete search history.

(56) References Cited

U.S. PATENT DOCUMENTS

| | | | |
|---|---|---|---|
| 5,872,970 A | 2/1999 | Pickett et al. | |
| 6,353,844 B1 | 3/2002 | Bitar et al. | |
| 6,910,070 B1 * | 6/2005 | Mishra et al. | 709/224 |
| 6,934,949 B2 | 8/2005 | Smith et al. | |
| 7,085,803 B1 | 8/2006 | Shisler et al. | |
| 7,353,514 B1 * | 4/2008 | Camp et al. | 718/101 |
| 7,634,542 B1 * | 12/2009 | Krause et al. | 709/206 |
| 7,707,585 B2 * | 4/2010 | Herrmann | 719/314 |
| 2002/0161814 A1 * | 10/2002 | Wical | 709/101 |
| 2003/0014551 A1 * | 1/2003 | Ishibashi et al. | 709/310 |
| 2003/0135542 A1 * | 7/2003 | Boudreau | 709/203 |
| 2003/0187969 A1 * | 10/2003 | Wilcock | 709/223 |
| 2003/0229725 A1 * | 12/2003 | Chen et al. | 709/314 |
| 2004/0054641 A1 | 3/2004 | Smith | |
| 2004/0098719 A1 * | 5/2004 | Smith et al. | 718/101 |
| 2004/0172632 A1 | 9/2004 | Smith et al. | |
| 2004/0244007 A1 * | 12/2004 | Garza et al. | 718/105 |
| 2005/0114867 A1 * | 5/2005 | Xu et al. | 719/318 |
| 2005/0256826 A1 | 11/2005 | Hambrick et al. | |
| 2005/0289198 A1 * | 12/2005 | Todd | 707/204 |
| 2006/0123092 A1 * | 6/2006 | Madams et al. | 709/206 |
| 2006/0184944 A1 | 8/2006 | Schwerk | |
| 2006/0248533 A1 | 11/2006 | Inari | |
| 2006/0294521 A1 | 12/2006 | Weitlisbach et al. | |
| 2007/0239898 A1 * | 10/2007 | Friend et al. | 709/248 |
| 2008/0025326 A1 * | 1/2008 | Kumar et al. | 370/401 |

OTHER PUBLICATIONS

BMC Software, "Product Authorization", Quick Start for MVS, Version 3.4, 2004, pp. 33-36.
CNS, UF Computing & Networking Services, "IBM Job Control Language Conventions at CNS", Jul. 26, 2006, pp. 17-18.

* cited by examiner

*Primary Examiner* — Jennifer To
*Assistant Examiner* — Tammy Lee
(74) *Attorney, Agent, or Firm* — Toler Law Group

(57) ABSTRACT

A method, system, and computer program product for initiating batch jobs in a message queuing information system are provided. The method, system, and computer program product provide for monitoring a message queue in the message queuing information system, detecting a predetermined condition in the message queue, determining whether a member name is associated with the predetermined condition, determining whether a server is available responsive to a member name being associated with the predetermined condition, and sending the member name to the server for the server to attach a batch job to load or unload one or more messages in the message queue based on information included in the member name responsive to a server being available.

20 Claims, 5 Drawing Sheets

MONITORING MESSAGE QUEUES IN MESSAGE QUEUING INFORMATION SYSTEMS AND INITIATING BATCH JOBS TO PERFORM FUNCTIONS ON THE MESSAGE QUEUES

FIELD OF THE INVENTION

The present invention relates generally to initiation of batch jobs in message queuing information systems.

BACKGROUND OF THE INVENTION

With message queuing information systems, such as IMS (Information Management System), a product of International Business Machines Corp. of Armonk, N.Y., it is important to ensure that message queues in the message queuing information systems do not fill up to a point such that the message queuing information systems will be forced to shut down. In order to keep the message queues from reaching that point, batch jobs can be started to unload messages from the message queues.

Batch jobs, however, are currently under the control of message queuing information systems. This is not ideal because if a message queuing information system is on the verge of shutting down as a result of too many messages being loaded in message queues, then the message queuing information system may not be in any condition to control a batch job.

In addition, the number of ways to start a batch job in a message queuing information system is limited. Currently, batch jobs either have to be started by a job scheduler in the message queuing information system or by a user from a client terminal through a server connected to the message queuing information system.

Starting a batch job from a client terminal is further complicated by the fact that presently, each server can only connect to a single message queuing information system and each message queuing information system can only connect to a single server. Hence, in order to start a batch job at a particular message queuing information system, a user must locate the single server that is connected to the particular message queuing information system and then go through that single server to start the batch job at the particular message queuing information system.

SUMMARY OF THE INVENTION

A method, system, and computer program product for initiating batch jobs in a message queuing information system are provided. The method, system, and computer program product provide for monitoring a message queue in the message queuing information system, detecting a predetermined condition in the message queue, determining whether a member name is associated with the predetermined condition, determining whether a server is available responsive to a member name being associated with the predetermined condition, and sending the member name to the server for the server to attach a batch job to load or unload one or more messages in the message queue based on information included in the member name responsive to a server being available. In one implementation, the server and the message queuing information system are not part of a single logical partition (LPAR).

DETAILED DESCRIPTION

Figure 1:
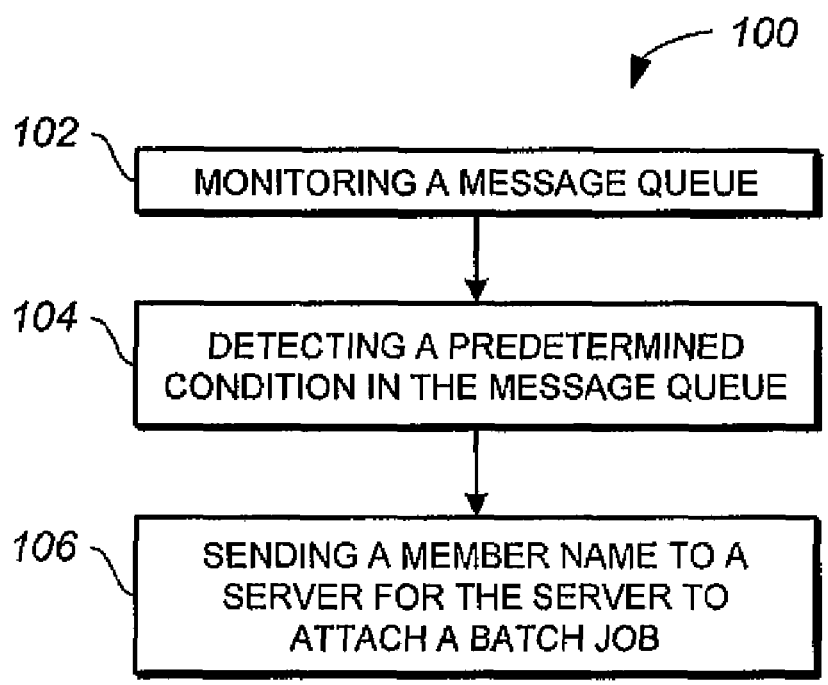
FIG. 1 depicts a process for initiating batch jobs in a message queuing information system according to an implementation of the invention.

The present invention generally relates to initiation of batch jobs in message queuing information systems. The following description is presented to enable one of ordinary skill in the art to make and use the invention and is provided in the context of a patent application and its requirements. The present invention is not intended to be limited to the implementations shown, but is to be accorded the widest scope consistent with the principles and features described herein.

In a non-queuing information system, such as CICS (Customer Information Control System), a product of International Business Machines Corp. of Armonk, N.Y., each message (e.g., data transmitted from a client terminal) is processed upon receipt. In contrast, in a message queuing information system, such as IMS (Information Management System), also a product of International Business Machines Corp., each message is placed in a queue where it awaits processing.

When it is time to process a message in a queue, an application is dispatched. The dispatched application then pulls the message off the queue and performs one or more functions based on the message (e.g., retrieve data, manipulate data, and so forth). Sometimes, the application will also place a new message in the queue, for example, the new message could include data that is to be sent back to an entity (e.g., a client terminal) that sent the message.

While one message is being processed, thousands of other messages could be placed on the queue. If a rate at which a queue in a message queuing information system is filling up with messages is faster than a rate at which messages in the queue is being processed, then the queue could completely fill up and be unable to load new messages, which would cause the message queuing information system to terminate (e.g., fail, shut down, and the like). Therefore, it is vital to ensure that this does not happen to any message queuing information system queues.

Batch jobs can be initiated in a message queuing information system to unload (e.g., remove, pull off, etc.) messages in a queue when the queue is close to becoming completely filled. Currently, however, any batch job that is initiated is under the control of the message queuing information system. This could be problematic because if the message queuing information system is already overburdened with messages, then it may not have the resources necessary to control a batch job.

In addition, at present, initiation of a batch job in a message queuing information system can only occur one of two ways. A batch job can either be started by a job scheduler of the message queuing information system or by a user at a client terminal via a server connected to the message queuing information system.

Since each message queuing information system can presently connect to only one server and each server can presently connect to only one message queuing information system, initiating a batch job in a message queuing information system from a client terminal could be somewhat complex. In particular, because a user at the client terminal must go through the only server that is connected to the message queuing information system to start the batch job, the client must first find that particular server.

Depicted in FIG. 1 is a process 100 for initiating batch jobs in a message queuing information system according to an implementation of the invention. At 102, a message queue in the message queuing information system is monitored. At 104, a predetermined condition is detected in the message queue.

The predetermined condition may be a warm start of the message queuing information system. A warm start occurs when a message queuing information system restarts after it has shut down and messages that were in a queue before the message queuing information system shut down are reloaded.

The predetermined condition may also be a cold start of the message queuing information system. A cold start occurs when a message queuing information system starts for a first time or when a message queuing information system restarts after it has shut down and messages that were in a queue before the message queuing information system shut down are not reloaded.

In addition, the predetermined condition may be a number of messages in the message queue reaching a preset threshold. In one implementation, the preset threshold is a threshold defined by a user, such as 71%, which can be translated into a specific number of messages based on a total number of messages a queue can hold. In another implementation, the preset threshold may be based on a programmed upper threshold and a programmed lower threshold.

For example, suppose a programmed lower threshold is 25% and a programmed upper threshold is 75%. Several preset thresholds can then be created based on the programmed lower and upper thresholds, such as 25%, 50%, and 75%. The range between the programmed upper and lower thresholds may be much closer, such as between 10% and 20%. Additionally, the programmed upper and lower thresholds may be user modifiable. Further, as with a user-defined threshold, the programmed upper and lower thresholds can be translated into a specific number of messages based on a queue's capacity.

Referring back to FIG. 1, at 106, a member name is sent to a server for the server to attach a batch job to unload or load one or more messages in the message queue in response to the member name being associated with the predetermined condition and the server being available. In one implementation, attaching in batch job comprises starting a generic batch job, i.e., a batch job that is not pre-programmed to perform particular functions (e.g., only unload messages, only load messages, only unload particular messages, only load particular messages, only unload messages to a particular location, and the like) and passing information (e.g., parameters such as data definition statements, dataset names, and the like) included in the member name to the generic batch job, which will then perform particular function(s) based on the parameters.

Although not depicted in FIG. 1, process 100 may include an additional process block in which a batch job corresponding to a job name is started in response to the job name being associated with the predetermined condition and no member name being associated with the predetermined condition or no server being available. Unlike the generic batch job, the batch job corresponding to the job name is pre-programmed to perform particular functions. This is not to say that the batch job corresponding to the job name cannot be later modified by a user.

Figure 2A:
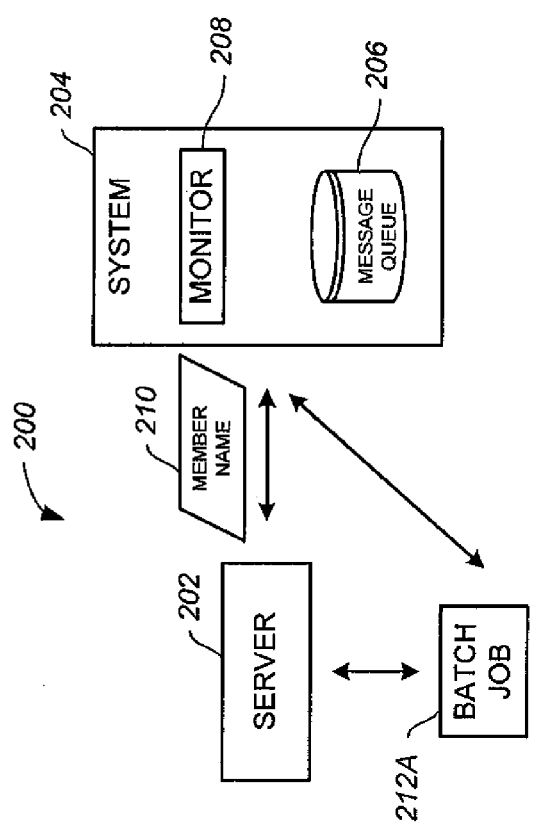
FIGS. 2A-2B illustrate a system for initiating batch jobs in message queuing information systems according to various implementations of the invention.
Figure 2B:
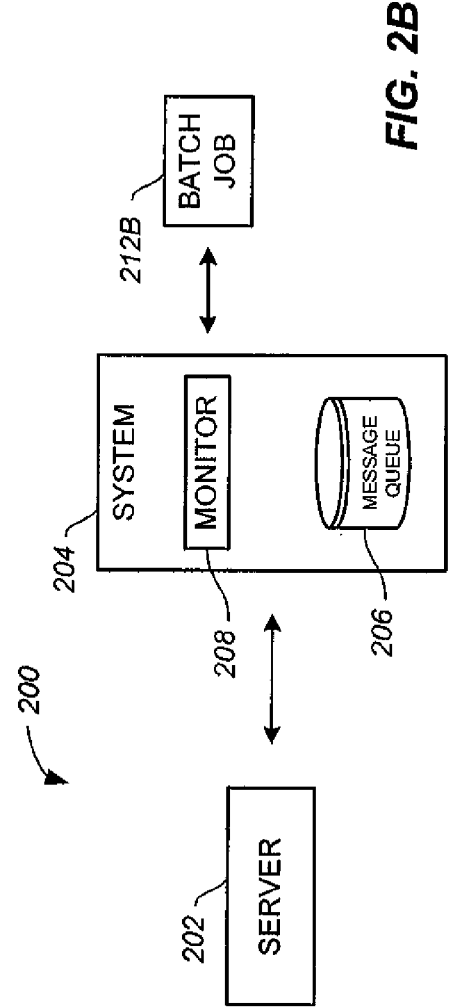

FIGS. 2A-2B illustrate a system 200 for initiating batch jobs in message queuing information systems according to various implementations of the invention. System 200 includes a server 202 and a message queuing information system 204 in communication with the server 202. System 200 may be, for example, a mainframe system. In addition, system 200 may include multiple logical partitions (LPARs) (not illustrated). Server 202 and message queuing information system 204 need not be resident in the same LPAR of system 200.

In the implementations illustrated, a message queue 206 and a queue monitoring and control component 208 are provided in message queuing information system 204. Even though queue monitoring and control component 208 is illustrated as being a part of message queuing information system 204, it is not under the control of message queuing information system 204. In fact, queue monitoring and control component 208 may not be provided as a part of message queuing information system 204 in other implementations.

Queue monitoring and control component 208 is provided to monitor message queue 206. If queue monitoring and control component 208 detects a predetermined condition in the message queue, then it will determine whether a member name is associated with the predetermined condition. A member name may be defined in a procedure library (not shown) in system 200. Once it is determined that a member name is associated with the predetermined condition detected, queue monitoring and control component 208 will determine whether server 202 is available.

In FIG. 2A, a member name 210 is determined to be associated with the detected predetermined condition and server 202 is determined to be available. As a result, member name 210 is sent by queue monitoring and control component 208 to server 202. Server 202 then attaches a batch job 212A and passes parameters contained in member name 210 to batch job 212A. Batch job 212A will then perform functions on message queue 206 based on the parameters. For instance, batch job 212A may send requests to queue monitoring and control component 208, which controls the actual loading and/or unloading of messages in message queue 206.

If queue monitoring and control component 208 determines that a member name is not associated with the predetermined condition detected or if it determines that server 202 is not available, it will determine whether a job name is associated with the detected predetermined condition. In FIG. 2B, a job name (not shown) is determined to be associated with the predetermined condition detected. As a result, a batch job 212B is started by queue monitoring and control component 208.

Figure 3:
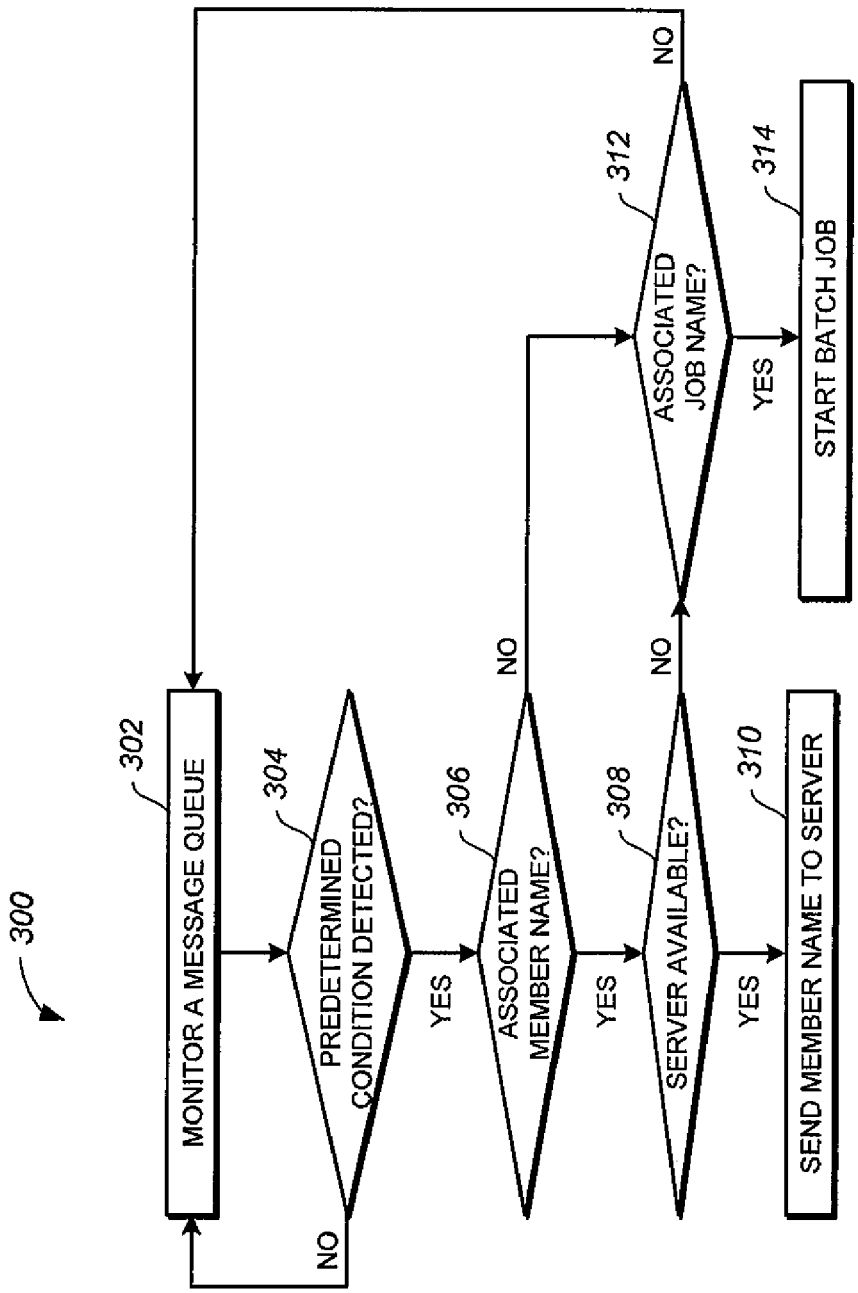
FIG. 3 shows a process for initiating batch jobs in a message queuing information system according to an implementation of the invention.

Shown in FIG. 3 is a process 300 for initiating batch jobs in a message queuing information system according to an implementation of the invention. At 302, a message queue of the message queuing information system is monitored. At 304, a determination is made as to whether a predetermined condition is detected in the message queue. The message queue may be checked for a plurality of predetermined conditions.

If no predetermined condition is detected at 304, process 300 returns to process block 302. However, if a predetermined condition is detected, a determination is made at 306 as to whether a member name is associated with the predetermined condition detected. If a member name is associated with the detected predetermined condition, a determination is made at 308 as to whether a server is available. In response to a server being available, the member name is sent to the server at 310 for the server to attach a batch job to unload or load one or more messages in the message queue based on information included in the member name.

On the other hand, if it is determined at 306 that a member name is not associated with the predetermined condition detected or if it is determined at 308 that a server is not available, a determination is made at 312 as to whether a job name is associated with the predetermined condition. If a job name is associated with the predetermined condition, then at 314, a batch job corresponding to the job name is started to unload or load one or more messages in the message queue. Otherwise, process 300 returns to process block 302.

The batch job started, whether based on a member name or corresponding to job name, varies depending on the predetermined condition detected. For example, in response to detecting a cold start, a batch job may be needed to re-load messages that were in the message queue prior to the cold start back into the message queue. In another example, in response to detecting a warm start, a batch job may be needed to unload messages in the message queue that have been there too long. As a further example, in response to detecting crossing of a preset threshold, depending on the preset threshold, a batch job may be needed to unload only particular types of messages, to unload messages to a particular location where they may be reloaded at a later time, or the like.

Figure 4:
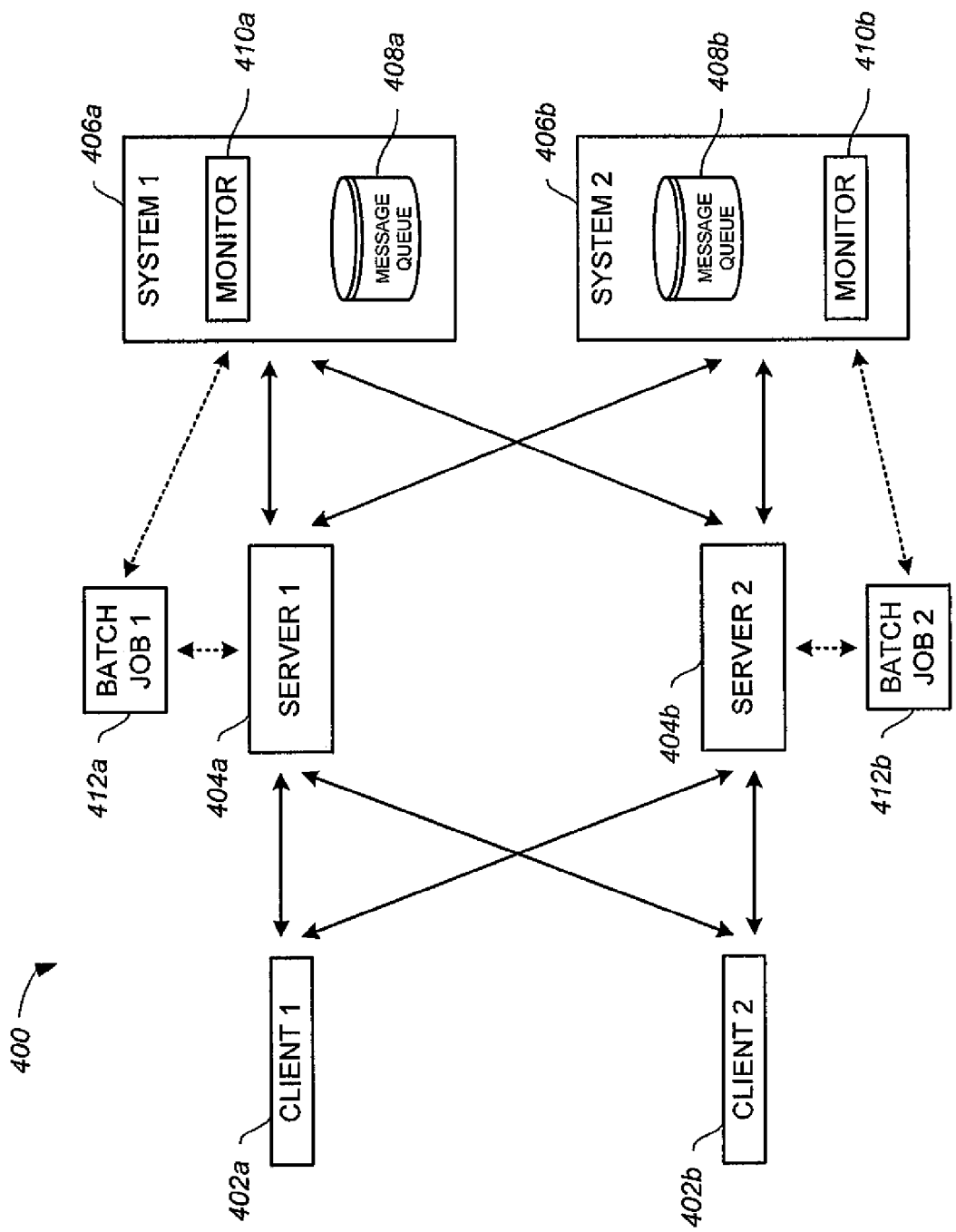
FIG. 4 depicts a system for initiating batch jobs in message queuing information systems according to an implementation of the invention.

FIG. 4 depicts a system 400 for initiating batch jobs in message queuing information systems according to an implementation of the invention. System 400 includes client terminals 402a-402b, servers 404a-404b, and message queuing information systems 406a-406b. Other implementations of system 400 may include more or less client terminals, servers, and/or message queuing information systems. In addition, system 400 may include other modules, components, and so forth (not shown).

In the implementation, message queuing information systems 406a-406b each includes a message queue 408a/408b and a queue monitoring and control component 410a/410b. One or both of message queuing information systems 406a and 406b may include additional message queues (not depicted). Additionally, one or both of queue monitoring and control components 410a-410b may be provided outside of message queuing information systems 406a-406b.

As depicted in FIG. 4, batch jobs 412a-412b have been initiated. Batch jobs 412a-412b may have been initiated by servers 404a-404b based on associated member names (not shown), by queue monitoring and control components 410a-410b according to associated job names (not shown), by one or more users at client terminals 402a-402b, or by a job scheduler (not depicted) of system 400. In the implementation, each client terminal 402a-402b can communicate with both servers 404a-404b. Additionally, each server 404a-404b can connect to both message queuing information systems 406a-406b and vice versa.

Thus, even though it is not depicted as such, batch job 412a may be initiated by server 404a based on a member name sent by queue monitoring and control component 410b and may instead be loading or unloading messages from message queue 408b in message queuing information system 406b rather than message queue 408a in message queuing information system 406a. In addition, a user at one of client terminals 402a-402b can initiate a batch job to load or unload messages in message queue 408a or 408b via either server 404a or 404b.

By removing control of batch jobs from message queuing information systems, there is no longer a concern with message queuing information systems not having sufficient resources to control needed batch jobs. Additional ways of initiating batch jobs have also been provided, which provide flexibility. Further, because there is no longer a one-to-one relationship between servers and message queuing information systems, initiation of batch jobs is less complex.

The invention can take the form of an entirely hardware implementation, an entirely software implementation, or an implementation containing both hardware and software elements. In one aspect, the invention is implemented in software, which includes, but is not limited to, application software, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 5:
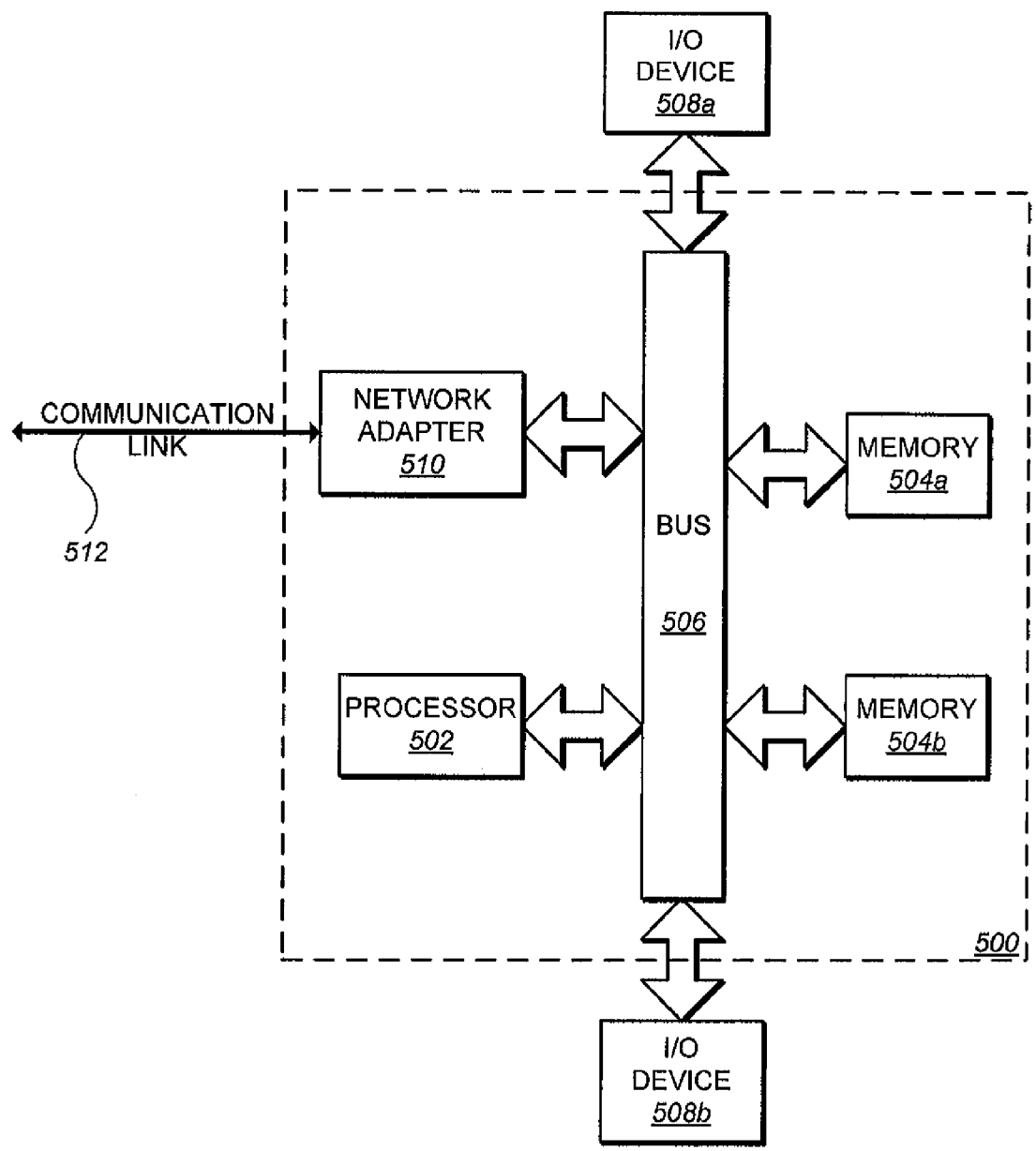
FIG. 5 illustrates a block diagram of a data processing system with which implementations of the invention can be implemented.

FIG. 5 shows a data processing system 500 suitable for storing and/or executing program code. Data processing system 500 includes a processor 502 coupled to memory elements 504a-b through a system bus 506. In other implementations, data processing system 500 may include more than one processor and each processor may be coupled directly or indirectly to one or more memory elements through a system bus.

Memory elements 504a-b can include local memory employed during actual execution of the program code, bulk storage, and cache memories that provide temporary storage of at least some program code in order to reduce the number of times the code must be retrieved from bulk storage during execution. As shown, input/output or I/O devices 508a-b (including, but not limited to, keyboards, displays, pointing devices, etc.) are coupled to data processing system 500. I/O devices 508a-b may be coupled to data processing system 500 directly or indirectly through intervening I/O controllers (not shown).

In the implementation, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

While various implementations initiating batch jobs in message queuing information systems have been described, the technical scope of the present invention is not limited thereto. For example, the present invention is described in terms of particular systems having certain components and particular methods having certain steps in a certain order. One of ordinary skill in the art, however, will readily recognize that the methods described herein can, for instance, include additional steps and/or be in a different order, and that the systems described herein can, for instance, include additional or substitute components. Hence, various modifications or improvements can be added to the above implementations and those modifications or improvements fall within the technical scope of the present invention.

What is claimed is:

1. A method comprising:
monitoring, at a queue monitoring and control component including a memory coupled to a processor, a message queue in a message queuing information system;
detecting, at the queue monitoring and control component, a predetermined condition in the message queue;
determining whether a first instruction defined in a procedure library is associated with the predetermined condition, wherein the first instruction includes parameter information associated with a first batch of messages in the message queue;
in response to determining that the first instruction is associated with the predetermined condition, determining whether a server coupled to the message queuing information system is available;
in response to determining that the server is available, sending the first instruction to the server from the queue monitoring and control component, wherein the server initiates a first batch job based on the first instruction, and wherein the first batch job performs one or more functions on the message queue based on the parameter information included in the first instruction; and
in response to determining that the first instruction is not associated with the predetermined condition, initiating, at the queue monitoring and control component, a second batch job on a second batch of messages in the message queue based on a second instruction.

2. The method of claim 1, further comprising:
in response to determining that the first instruction is not associated with the predetermined condition, determining whether the second instruction defined in a procedure library is associated with the predetermined condition,
wherein the second batch job is initiated in response to a determination that the second instruction is associated with the predetermined condition, wherein the second batch job performs one or more predefined functions on the second batch of messages in the message queue.

3. The method of claim 1, wherein the predetermined condition is a number of messages in the message queue reaching a threshold.

4. The method of claim 3, wherein the threshold is a user-defined threshold.

5. The method of claim 3, wherein first batch job is associated with a batch unload function and wherein the first batch of messages are associated with messages having a particular message type.

6. The method of claim 3, wherein first batch job is associated with a batch unload function and wherein the first batch of messages are associated with messages from a particular client terminal associated with the message queuing information system.

7. The method of claim 1, wherein the server is connected to more than one message queuing information system.

8. The method of claim 1, wherein the first batch job is independent of control of the message queuing information system.

9. The method of claim 1, wherein the parameter information includes data definition statements and dataset names.

10. The method of claim 1, wherein the one or more functions performed by the first batch job includes an unload function to unload the first batch of messages from the message queue to the server.

11. The method of claim 1, wherein the first batch job is a generic batch job.

12. A system comprising:
a message queuing information system, the message queuing information system comprising a memory including a message queue; and
a queue monitoring and control component in communication with the message queuing information system, wherein the queue monitoring and control component includes a processor and a memory including processor executable instructions that, when executed by the processor, cause the processor to:
monitor the message queue in the message queuing information system,
detect a predetermined condition in the message queue,
determine whether a first instruction is associated with the predetermined condition, wherein the first instruction includes parameter information associated with a first batch of messages in the message queue,
in response to determining that the first instruction is associated with the predetermined condition, determine whether a server coupled to the message queuing information system is available,
in response to determining that the server is available, send the first instruction to the server, wherein the server initiates a first batch job based on the first instruction, and wherein the first batch job performs one or more functions based on the parameter information included in the first instruction; and
in response to a determination that the first instruction is not associated with the predetermined condition, initiate a second batch job on a second batch of messages in the message queue based on a second instruction.

13. The system of claim 12, wherein the processor executable instructions, when executed by the processor, cause the processor to:
in response to the server not being available, determine whether a second instruction is associated with the predetermined condition, and
wherein the second batch job is initiated in response to a determination that the second instruction is associated with the predetermined condition, and wherein the second batch job performs one or more predefined functions on the second batch of messages in the message queue.

14. The system of claim 12, wherein the predetermined condition is one of:
a cold start of the message queuing information system,
a warm start of the message queuing information system, and
a number of messages in the message queue reaching a preset threshold.

15. The system of claim 14, wherein the first batch job loads the first batch of messages into the message queue when the predetermined condition is the cold start, wherein the first batch of messages were in the message queue prior to the cold start.

16. The system of claim 14, wherein the server is connected to more than one message queuing information system, wherein the first batch job unloads the first batch of messages from the message queue when the predetermined condition is the warm start, and wherein identification of the first batch of messages is based at least in part on an amount of time a particular message of the first batch of messages persisted in the message queue.

17. A computer program product comprising a non-transitory computer-readable medium, the computer-readable medium being encoded with a computer program that, when executed on a computer, causes the computer to:
- monitor a message queue in a message queuing information system;
- detect a predetermined condition in the message queue;
- determine whether a first instruction is associated with the predetermined condition, wherein the first instruction includes parameter information associated with a first batch of messages in the message queue;
- in response to determining that the first instruction is associated with the predetermined condition, determine whether a server coupled to the message queuing information system is available;
- in response to a determination that the server is available, send the first instruction to the server, wherein the server initiates a first batch job based on the first instruction, and wherein the first batch job performs one or more functions based on the parameter information included in the first instruction; and
- in response to a determination that the first instruction is not associated with the predetermined condition, initiate a second batch job on a second batch of messages in the message queue based on a second instruction.

18. The computer program product of claim 17, wherein the computer program further causes the computer to:
- determine whether the second instruction is associated with the predetermined condition,
- wherein the second batch job performs one or more predefined functions on a second batch of messages in the message queue, and
- wherein the one or more predefined functions include at least one of an unload messages only function, a load messages only function, an unload particular messages only function, a load particular messages only function, and an unload messages to a particular location only function.

19. The computer program product of claim 17, wherein the predetermined condition is one of:
- a first number of messages in the message queue reaching a first threshold, and
- a second number of messages in the message queue reaching a second threshold.

20. The computer program product of claim 19, wherein the first threshold is associated with a batch unload of messages and wherein the second threshold is associated with a batch load of messages.

* * * * *